United States Patent [19]

Boyden

[11] Patent Number: 5,737,436

[45] Date of Patent: Apr. 7, 1998

[54] EARPHONES WITH EYEGLASS ATTATCHMENTS

[75] Inventor: James H. Boyden, Los Altos Hills, Calif.

[73] Assignee: Interval Research Corporation, Palo Alto, Calif.

[21] Appl. No.: 826,477

[22] Filed: Mar. 27, 1997

Related U.S. Application Data

[63] Continuation of Ser. No. 530,760, Sep. 19, 1995, abandoned.

[51] Int. Cl.[6] ............................................. H04R 25/00
[52] U.S. Cl. .................... 381/187; 381/183; 381/68.7; 381/68.5
[58] Field of Search ............................... 381/187, 183, 381/68.7, 68.6, 68, 68.5; 351/41, 111, 121, 123

*Primary Examiner*—Sinh Tran
*Attorney, Agent, or Firm*—Brooks & Kushman

[57] ABSTRACT

A portable, wearable personal audio system which includes an acoustic sample chamber and an acoustically transparent ear insert member. A tubular member transmits the audio from the sample chamber and module to the ear canal. An additional transducer, preferably made from a piezoelectric material, can be provided in the ear insert member or at the outer end of the tubular member. An electronics mechanism is preferably supplied as part of a behind-the-ear module or as part of the temple of a pair of eyeglasses. Stereo systems require separate systems for each ear. A quick exchange adapter mechanism is provided to connect the eyeglasses with a behind-the-ear module. A Velcro-type fastener or magnetic fastener mechanism connects the end of the eyeglasses to the module.

10 Claims, 3 Drawing Sheets

EARPHONES WITH EYEGLASS ATTATCHMENTS

This is a continuation of application Ser. No. 08/530,760 filed on Sep. 19, 1995 now abandoned.

TECHNICAL FIELD

The present invention relates to portable entertainment and personal communication systems, particularly wearable audio systems which use earphones.

BACKGROUND OF THE INVENTION

There are many situations where it is desirable to provide audio output for personal use to be worn or carried near the body. This audio output can be used for portable entertainment, personal communications, hearing prosthesis and the like. These personal and portable communications and entertainment products include, for example, cellular and portable telephones, AM and FM radios, cassette tape players, CD players, and audio portions of portable video systems and personal monitors.

The audio output for many of these systems is typically presented to the wearer through the use of transducers (a/k/a "speakers") physically positioned in the ear or covering the ear, such as earphones and headphones. Earphones offer privacy, easier integration with clothing, and address concerns for fashion and social acceptability. Earphones also have the additional advantage that when used in conjunction with microphones, the problem of feedback control is greatly ameliorated. Further, they are efficient in terms of sound pressure level (SPL) delivered for a given electrical output.

Headphones, that is wearable devices which cover the wearer's ears, can provide excellent high fidelity audio and are reasonably comfortable. However, the headphones are rather obtrusive for many social circumstances and attenuate environmental sounds.

Earphones, as well as headphones, are often uncomfortable to wear for long periods of time. Also, earphones and headphones block or attenuate environmental sounds causing the wearer to lose contact with his or her surroundings. In this regard, this can compromise safety considerations if the wearer is engaging in activity such as running, driving a vehicle, or operating machinery.

There also are a number of small earphone devices in use today which are placed on or over the wearer's ears, but these are not as efficient in creating high fidelity sounds as headphones, and also block out environmental sounds causing the wearer to lose contact with his or her surroundings.

"Earbud" earphones are also in use today with portable entertainment systems. These earphones are placed immediately adjacent the ear canal and provide good audio fidelity, although their placement is sensitive in order to obtain the best performance. Earbuds also generally become uncomfortable after extended use and often block and attenuate environmental sounds at the expense of safety and loss of audio contact with the wearer's surroundings.

It is commonly desired to provide stereo output, that is two-channel sound, from these portable entertainment and personal communication systems. Stereo is particularly used for entertainment purposes and for other applications of spatialized audio. Stereo audio output is usually provided to provide a better high fidelity sound for the system. Small loud speakers are inadequate to create broad-band high fidelity sound, however, particularly in the low frequency ranges. Typically, an enclosure of some type is required to secure the necessary reduction of net radiated intensity, especially in the low frequency audio ranges, in order to achieve optimum high fidelity sound. For wearable speakers, the requirement of an enclosure creates a problem. In general, the volume of the enclosure will be quite small and its acoustic stiffness will dominate the speaker behavior. The result will be a high resonant frequency and consequently a poor low frequency response.

Other devices commonly used to provide audio to wearer's ears include hearing aids. Developments in this area have led to devices which are comfortable for long periods of time, but they are usually designed specifically to exclude sounds that might directly enter the ear canal in order to control feedback. Also, hearing aids are directed specifically to providing good audio response over the primary speech frequencies and often specifically de-emphasize low and high frequencies in order to enhance speech intelligibility. Some hearing aids utilize an electronic or transducer module which is positioned behind the ear of the wearer or is integrated into the earpiece portion of the temple of a pair of glasses.

People who wear glasses all the time, or desire to occasionally wear sunglasses or safety glasses, or need to switch various pairs of eyeglasses for reading, distance, or the like, encounter problems with behind-the-ear and eyeglass temple modules. Every time the eyeglasses are removed or exchanged, the audio function of the hearing aid may disappear. Also, if the hearing aid utilizes an ear canal insert, it also needs to be removed which can be an awkward process. Further, if the module is not integrated into the eyeglass temple, then the temple of the glasses and the behind-the-ear module may interfere and either cause discomfort, or position the glasses such that vision of the wearer is impaired or distorted.

SUMMARY OF THE INVENTION

It is an object of the present invention to provide an improved audio system for portable entertainment and personal communication systems. It is another object of the present invention to provide a portable audio system which provides high quality sound, particularly at low audio frequencies.

It is another object of the present invention to provide a wearable audio system which can be easily worn and does not interfere with the person's activity, whether sports related or otherwise. It is a still further object of the present invention to provide a wearable audio system which does not require headphones or speakers to be positioned covering the wearer's ears and thus blocking environmental sounds.

It is an additional object of the present invention to provide a wearable audio system which provides high quality audio to the wearer, provides an insert in the ear, and still allows sufficient transmission of environmental sounds. It is a still additional object of the present invention to provide a wearable audio system which overcomes a number of the problems and drawbacks with present wearable audio systems, particularly those utilizing earphones.

A still further object of the present invention is to provide a wearable audio system which allows quick and convenient changing of eyeglasses or sunglasses without requiring multiple electronic audio modules.

The present invention fulfills these objects and overcomes the problems with known systems by providing a personal audio system which provides high quality sound and maintains contact with the wearer's environment even though an insert is used in the wearer's ear. The present invention utilizes a module with one or more sealed chambers, each with two cavities, positioned to provide audio emissions to the wearer's ears through a small tube. The cavities are separated by a common wall in which is mounted one or more transducers whose diaphragms communicate directly with the two cavities. When the transducer is driven at acoustic frequencies, it produces acoustic pressure within the cavities.

The chamber can be positioned in a module positioned either behind the ear of the wearer or in the temple portion of the wearer's eyeglasses. For stereo systems, one of the modules is provided for each of the wearer's ears. The electronics module can be included as part of the module, or alternatively situated at another position on the wearer's body or clothing and hard wired to one or more chambers positioned adjacent the wearer's ears, such as behind the ears or incorporated in eyeglasses.

A tubular member ("tube") is used to transmit the audio signals to the wearer's ears. The distal end of the tube is arranged so that its open end is near the entrance of the ear canal. The open end is held and stabilized in position in the ear with an acoustically transparent support member which is inserted into the ear. The support member is preferably made from an open cell foam material and can be coated for increased comfort. If a coating is utilized, it is perforated in order to maintain overall acoustic transparency.

The acoustic pressure at the open end of the tube of a chamber-tube configuration, for constant transducer input, will be nominally constant from sub-audio frequencies up to the chamber tube Helmholtz resonance frequency, where there will occur a peak. Above that frequency, typically 1–4 kHz for small earphone modules, the asymptotic response is a 6 db per octave rolloff in pressure (12 db in acoustic intensity). Superimposed on this asymptote are a series of resonant peaks whose frequencies are determined by the cavity-tube geometry. These resonances can be substantially reduced by using known acoustic compensation techniques. This compensation could involve the use of a parallel tube, which is closed at the end, and acoustic damping elements. It is also possible to compensate the resonances by using complementary electrical filtering, e.g. with DSP (Digital Signal Processing). For high fidelity reproduction of the audio source it is necessary to compensate for the high frequency rolloff. This can be done electrically with an active filter or with DSP, using well known techniques.

In another embodiment, compensation for the high frequency acoustical rolloff can be accomplished by providing another transducer in addition to the one in the chamber-tube mode, the additional transducer being placed directly in the ear insert. This transducer is preferably fabricated from perforated piezoelectric material. The piezo material could also be positioned around the end of the tube and further could be divided into annular portions and act as an acoustic peristaltic pump. The two transducer system is preferably driven from a cross-over network which directs the low frequencies to the chamber transducer and the high frequencies to the ear insert transducer, the relative drive levels being set to achieve a substantially uniform response.

To eliminate problems with eyeglass wearers, or wearers who need to frequently change pairs of eyeglasses, a behind-the-ear module is provided which is adapted to be quickly attached to and released from the wearer's eyeglasses. An adapter mechanism is provided which connects the ends of the eyeglass temples to the module such that the eyeglasses can be quickly and easily removed and exchanged as desired.

These and other objects, features and advantages of the present invention will become apparent from the following description, of the invention when viewed in accordance with the attached drawings and appended claims.

BEST MODE(S) FOR CARRYING OUT THE INVENTION

Figure 1:
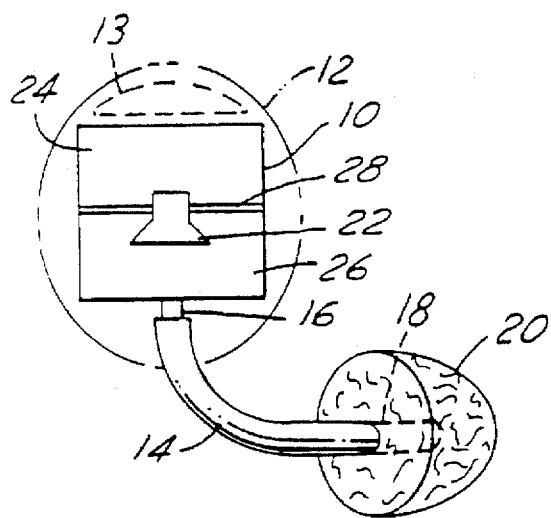
FIG. 1 illustrates an embodiment of the present invention which uses a sample chamber, a tubular member and an ear insert member.

In order to achieve high fidelity performance from a personal communication system, it is desirable to produce audio at the low frequencies, such as on the order of 80 Hz or less. Small enclosures and other earphones of conventional design are unsatisfactory for this purpose. One system for accomplishing high fidelity sound and providing the necessary low frequencies, is shown in commonly-owned U.S. patent application Ser. No. 08/482,759, filed Jun. 7, 1995, entitled "Sampled Chamber Transducer With Enhanced Low Frequency Response", the disclosure of which is hereby incorporated by reference herein.

In the system shown in that application, sampling chambers are used to produce the low frequency audio. The sampling chambers have a pair of cavities and acoustical pressure is provided through a tube connected to one or both of the cavities. When the open end of the tube is positioned adjacent the ear of a wearer, the hearing of the low frequencies of the system is substantially enhanced.

The acoustic pressure at the open end of the tube of a chamber-tube configuration, for constant transducer input, will be nominally constant from sub-audio frequencies up to the chamber tube Helmholtz resonance frequency, where there will occur a peak. Above that frequency, typically 1–4 kHz for small earphone modules, the asymptotic response is a 6 db per octave rolloff in pressure (12 db in acoustic intensity). Superimposed on this asymptote are a series of resonant peaks whose frequencies are determined by the cavity-tube geometry. These resonances can be substantially reduced by using known acoustic compensation techniques. This compensation could involve the use of a parallel tube, which is closed at the end, and acoustic damping elements. It is also possible to compensate the resonances by using complementary electrical filtering, e.g. with DSP (Digital Signal Processing). For high fidelity reproduction of the audio source it is necessary to compensate for the high frequency rolloff. This can be done electrically with an active filter or with DSP, using well known techniques.

In a preferred use of the system disclosed in U.S. patent application Ser. No. 482,759, the sample chambers are combined with separate high frequency transducers in an audio system. The additional transducers provide better high frequency audio performance where desired. The sample chambers transfer the low frequency audio very well. However, above the cavity Helmholtz resonance, the pressure transfer falls at 6 dB per octave (12 dB for intensity). The resonant frequency is typically on the order of 100–200 Hz or higher.

As a result, in some circumstances, a transducer or array of transducers in a sample chamber with the audio output being supplied through a tubular member, is sufficient to produce high quality sound. In other instances, it is desirable to provide an additional transducer or array of transducers to complement the audio from the sample chamber. Various networks and circuit diagrams for combining the sample chamber and additional transducers are shown in U.S. patent application Ser. No. 482,759.

In accordance with the present invention, the audio signals are produced by a module having a sample chamber, as well as a tubular member which is positioned and stabilized in the ear canal with an ear insert member. A schematic diagram of such a system is shown in FIG. 1.

In FIG. 1, the sample chamber 10 is incorporated into a module 12. A tubular member 14 is attached to the sample chamber at one end 16 and attached to an ear insert member 20 at its other end 18. A small transducer 22 is positioned in the chamber 10 which is divided into two cavities 24 and 26. Cavity 24 is sealed, except for a small leak to equalize atmospheric pressure changes. The second cavity 26 is coupled to the outside by tubular member 14. The transducer 22 is mounted on a common wall 28 separating the two cavities 24 and 26. The diaphragm of the transducer functions as a moving boundary between the two cavities. The volumes of the cavities 24 and 26 are designed for minimum volume consistent with using a transducer with adequate volume displacement to produce the desired acoustic pressure within the cavities and consequently at the open end of the tube 14.

Figure 6:
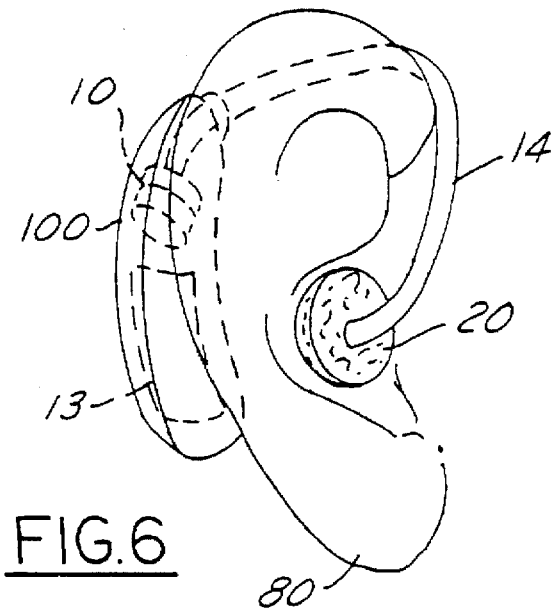
FIG. 6 illustrates use of the present invention with a behind-the-ear electronics module.
Figure 7:
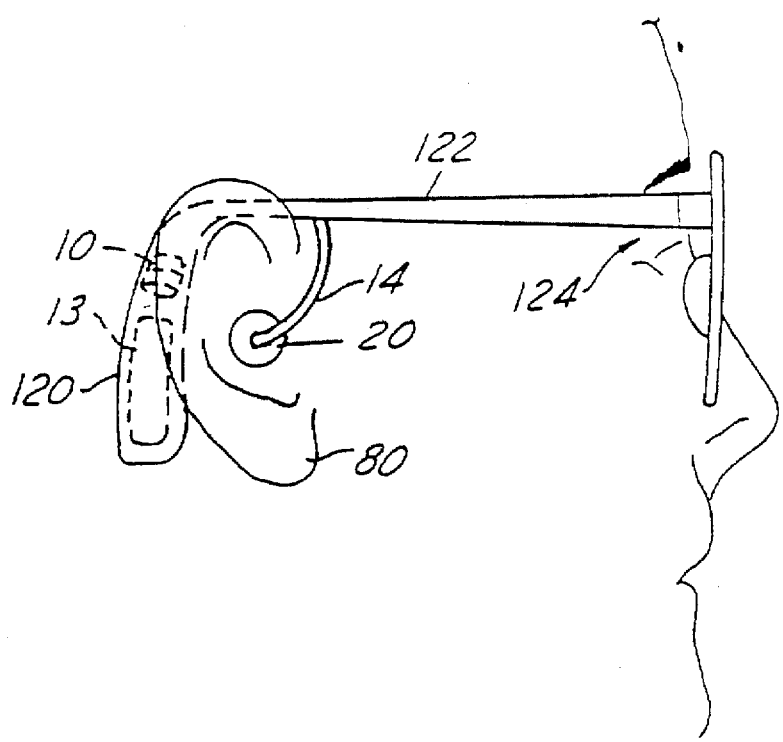
FIG. 7 illustrates use of the present invention with an electronics module incorporated into the temple of a pair of eyeglasses.

The module 12 also contains electronic circuitry 13, including amplifiers, equalizers and the like, as well as the power source, which preferably is a long life battery, which are standard in the art. Also, the module 12 could be formed as a behind-the-ear module 100, as shown in FIG. 6, or included as an electronics module 120 positioned on the end of the temple 122 of a pair of glasses 124, as shown in FIG. 7.

In this regard, the present invention is adaptable for use either as a personal communication system for one ear of the wearer or as a stereo high fidelity system for both ears of the wearer. In the latter system, a behind-the-ear module or eyeglass temple module is situated adjacent both of the ears of the wearer. For stereo systems, the two modules are connected by appropriate wiring to a common control system. The control system could be positioned at another part of the wearer's body, such as at the waist or at the wrist. In this regard, it is also possible to use wireless transmission of signals from the control system to the module or pair of modules.

In accordance with the present invention, the end 18 of the tube 14 emerging from the open cavity 26 is arranged so that its open end is positioned at or near the entrance to the ear canal of the wearer. The open end of the tube is stabilized in position in the ear with ear insert member 20. The ear insert member 20 can be molded to fit the individual wearer's ears, or can be an insert which is formable and usable for a wide variety of sizes and shapes of ear canals.

The ear insert and support member 20 is made from an acoustically transparent material, such as an open cell foam material. Acoustically transparent materials are materials which allow essentially 100% transmission of sounds through them. In this manner, the wearer has the ability to hear sounds connected with his or her environment at the same time that audio from the personal communication system is being supplied through the tubular member 14.

Foam materials are available which have negligible acoustic loss up to several centimeters in thickness. The tubular member 14 is secured to the foam insert 20 either directly, for example, with an adhesive, or by pressing the tube over or onto a fitting which has been secured into the foam piece. A fitting 30 of this type is shown, for example, in FIG. 2.

Figure 9:
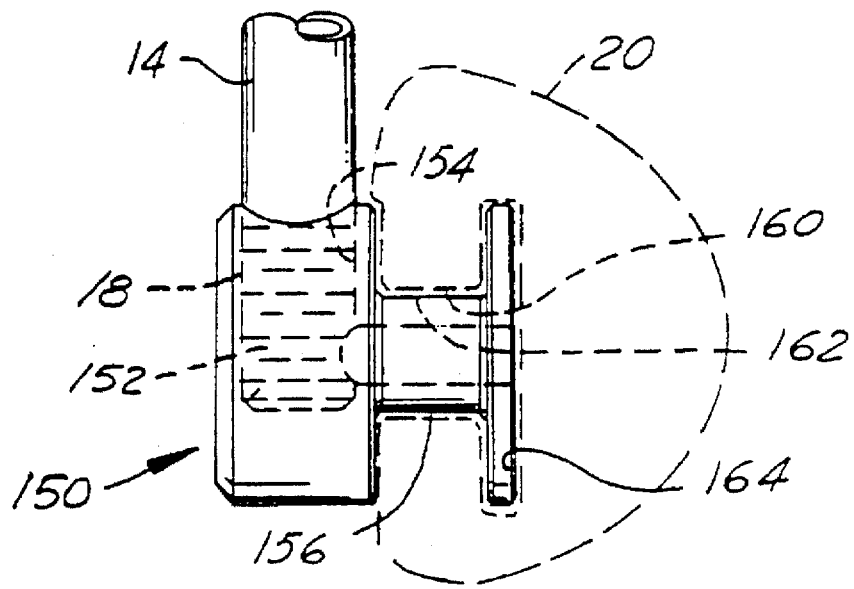
FIG. 9 depicts an alternate embodiment of an ear insert member.

Another embodiment of ear insert member 150 is shown in FIG. 9. A molded or formed housing 152 is attached to the end 18 of the tubular member 14. The circular housing 152 has a socket 154 for insertion of the end of the tubular member, an annular groove 156 and a circular disc 158. The foam insert member 20 has a central cavity 160, a first portion 162 which fits over groove 156 and a second portion 164 which fits over the disc 158. The foam insert member 20 is releasably held in place on the housing 132 in this manner, and can be easily removed for replacement or the like by manipulation of the soft foam material.

The housing 152 can be made of any conventional plastic or metal material, such as Delrin or aluminum, but preferably is made from an acrylic material.

Figure 2:
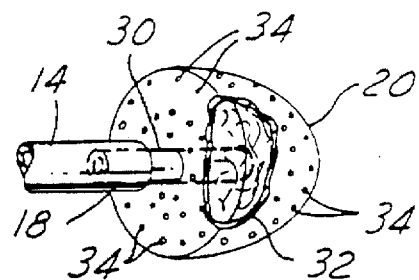
FIG. 2 illustrates an alternate embodiment of an ear insert member for use with the present invention.

The foam or other acoustically transparent material used for the ear insert is shaped to fit comfortably in the wearer's ear. In order to reduce possible discomfort or irritation caused by long periods of use, the foam or other material forming the ear insert member can be covered with a thin layer 32 of highly flexible plastic material. This is shown in FIG. 2. If a coating 32 is utilized, it is extensively perforated with openings 34 in order to maintain the overall acoustic transparency of the insert. In this regard, it may be preferable to only coat the areas of the insert which contact the ear of the wearer. This also makes it possible to maintain maximum malleability of the insert to conform comfortably to the wearer's ear. Further, full transparency of the insert can be maintained if there are not two opposed perforated walls which may cause attenuating resonances.

Figure 3:
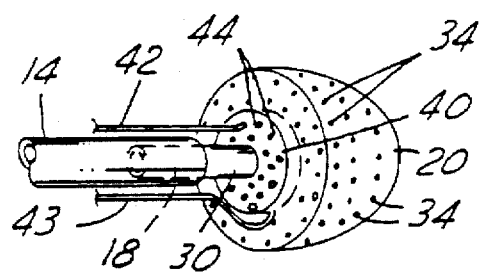
FIG. 3 illustrates an alternate embodiment of the present invention which incorporates an additional transducer in the ear insert member.

As an alternate embodiment of the invention, an additional transducer 40 is integrated into the tubular member and ear insert member. This is shown in FIG. 3. This embodiment provides better high frequency response. As explained above, even though low frequencies are transferred very well by the present invention, the cavity Helmholtz resonance may reduce the efficiency of the system at high frequencies.

Where an additional transducer 40 is utilized, it preferably is made from a piezoelectric material. In this regard, a satisfactory plastic piezo material is PVDF, although other equivalent materials could be utilized. The transducer is preferably on the order of 25 microns in thickness, and approximately 0.5 cm in diameter. As shown in FIG. 3, the transducer 40 is preferably molded directly into the foam ear insert member or bonded to it. Also, the electrical wires or connectors 42 and 43 from the electronics module to the transducer are protected in this manner from contact with the wearer's skin.

The piezoelectric transducer 40 also is perforated with a plurality of small holes or openings 44 in order to maintain acoustical transparency of the entire ear insert member for external sounds. With appropriate perforations, the system loses less than one dB of acoustical loss over the entire audible spectrum.

If desired, additional resonant compensating tubular members with acoustic damping resisters can be added to the system. These are known in the art. Also, as indicated above, these additional components preferably, but not necessarily, are situated in appropriate housings, such as the modules 100 and 120 (shown in FIGS. 6 and 7).

Figure 4:
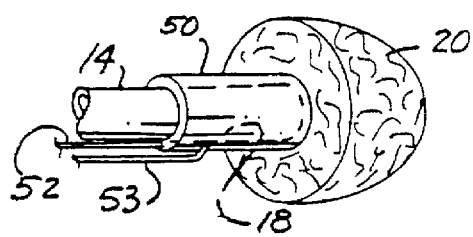
FIG. 4 illustrates an alternate embodiment which also uses an additional transducer in or adjacent to the ear insert member.

In FIG. 4, the piezoelectric material forming the additional transducer 50 is wrapped around the end 18 of the tubular member 14. The transducer 50 is preferably positioned in the ear insert member 20 or molded into it as desired. Of course, the open end of tube 14 is positioned to maintain proximity to the entrance of the wearer's ear canal.

Power is supplied to the transducer 50 by appropriate wires or connectors 52 and 53. If voltage is supplied so as to squeeze the tubular member 14, as is known, for example, in inkjet printers, the tube 14 will shrink and expand in diameter and generate pressure within the tube. This can produce the desired high frequency audio for the system.

Figure 5:
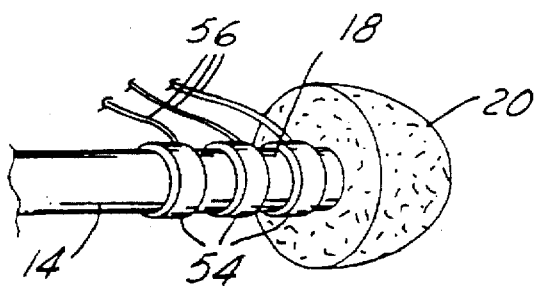
FIG. 5 illustrates still another embodiment of the invention utilizing an additional transducer adjacent the ear insert member.

Alternately, the piezo material can be divided into annular sections or members 54 as shown in FIG. 5. The annular members are secured or molded onto the end 18 of the tubular member 14 and connected by wires or connectors 56 to the electronics module. When voltage is applied to the separate members 54 on the tube with appropriate time delays which correspond to the velocity of sound in the tube, an effective acoustic peristaltic pump is created. This also could be used to produce the requisite audio frequencies desired for the system.

The two transducer system is preferably driven from a cross-over network which directs the low frequencies to the chamber transducer and the high frequencies to the ear insert transducer. The relative drive levels of the two frequencies are preferably set to achieve an overall subjectively uniform response.

Figure 10:
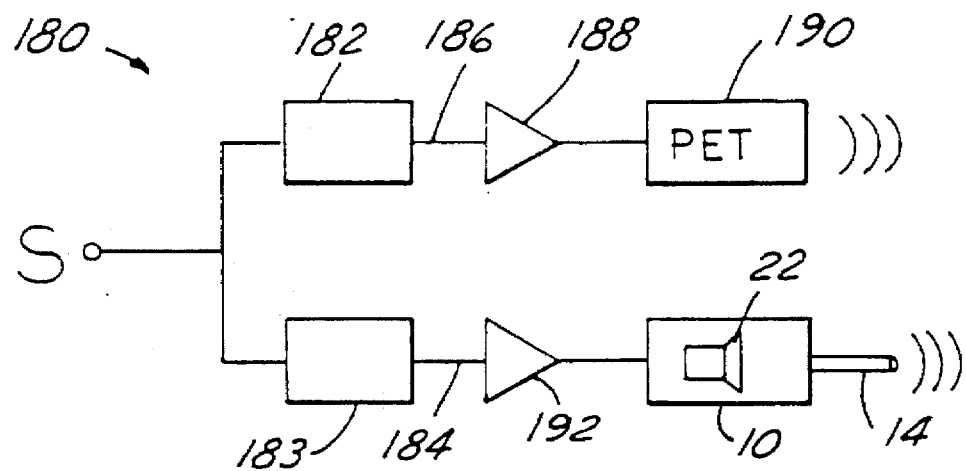
FIG. 10 depicts a cross-over network for use with the present invention.

A cross-over network 180 which can be used in accordance with the present invention is shown in FIG. 10. The audio signals S are split by band pass fillers 181 and 182 into a first frequency band 184 which are the lower frequency signals, and a second frequency band 186 which are the higher frequency signals. The higher frequency signals are amplified by amplifier 188 and used to drive the piezoelectric transducer (PET) 190. Similarly, the lower frequency signals are amplified by amplifier 192 and used to drive the transducer 22 in the sampler chamber 10. Tubular member 14 is connected to the chamber 10. The fillers 181 and 182 can have either an analog or digital implementation.

As indicated above, the electronic components of the present system could be provided in a wide variety of shapes and sizes and positioned at a wide variety of positions on the wearer. Preferably, however, the components are all integrated into an module 100 which fits behind the ear 80 of the wearer, as shown in FIG. 6, or into an eyeglass module 120, as shown in FIG. 7. In FIG. 6, the module 100 contains the sample chamber 10 and the electronic components 13, such as the power supply, amplifiers, and the like. The tubular member 14 is connected to the module 100 at one end and stabilized and positioned in the ear canal with ear insert member 20 at the other end. In FIG. 6, the ear of the wearer is referred to by the reference numeral 80.

In FIG. 7, the module 120 is incorporated onto the ends of the temples 122 of a pair of eyeglasses 124 and preferably contains all of the electronics 13. The tubular member 14 is connected at one end to the module 120 and positioned in proximity to the entrance of the ear canal of the wearer's ear 80 within ear insert member 20.

As indicated above, the present invention provides improved systems for personal communication and entertainment devices and hearing aid devices which are lightweight, easily portable, wearable by the user, and provide high quality audio. The audio for the systems could be provided by a number of various electronic devices and mechanisms known today. These include, but are not limited to, cellular and portable telephones, personal communications systems (PCS), AM and FM radios, cassette tape players, CD players, personal monitors and paging systems, and portable video systems.

As indicated above, problems are often encountered by wearers who want to utilize portable, wearable communication, entertainment and/or hearing aid systems incorporated in behind-the-ear modules, or as part of a pair of eyeglasses. Problems are encountered with behind-the-ear modules since they interfere with placement of the earpieces of eyeglasses. Also, if the module is incorporated into the temples of a pair of eyeglasses, then problems are encountered when the wearer wants to switch to a pair of sunglasses, reading glasses, etc. If the module is integrated into one pair of glasses, then the audio function of the system is removed every time the eyeglasses are taken off or the wearer must secure duplicates of possibly expensive electronics and acoustics modules. Also, this may require removing the ear insert at the same time, which may be awkward.

If there is no integration between the module and the eyeglasses, the temple of the glasses and a behind-the-ear module could interfere and cause discomfort, or position the glasses such that vision is impaired or distorted. The problem becomes especially troublesome when the audio system is required or desired to be used for long periods of time and several changes of glasses or removal of the glasses for one reason or another are required.

Figure 8:
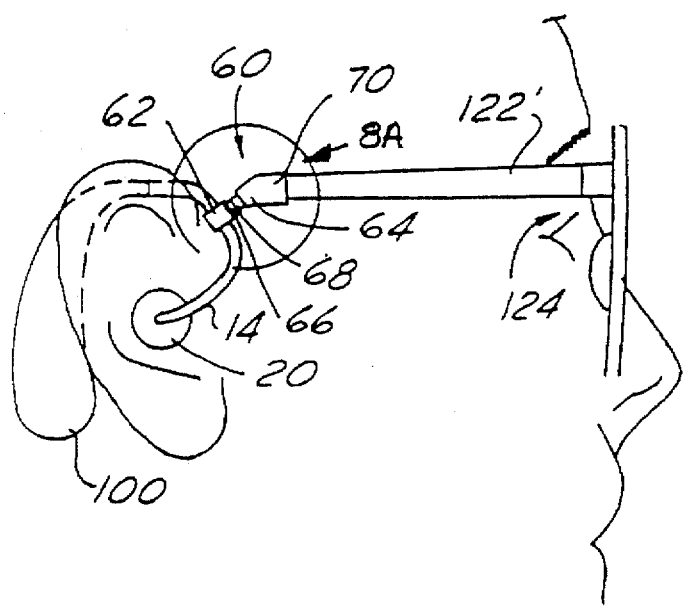
FIGS. 8 and 8A illustrate a quick-change adapter mechanism for use with the present invention.
Figure 8A:
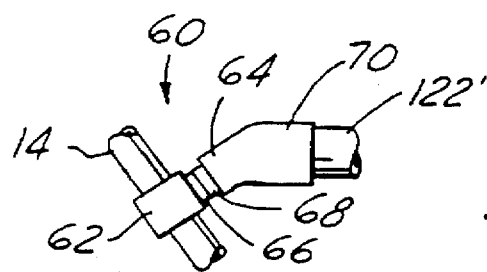

For this purpose, an adapter mechanism 60 is utilized, as shown in FIGS. 8 and 8A. The adapter 60 incorporates a first attachment member 62, a second attachment member 64, and mating connector members 66 and 68. The attachment member 62 is secured to the tubular member 14 (or alternately to the module 100). The attachment member 64 is attached to the end of the temple 122' of eyeglasses 124'. The temples 122' have been shortened by removal of the earpiece and a tubular member 70 is connected to the shortened end. The attachment member 64 is attached to or integrated as part of the tubular connector 70.

The connecting members 66 and 68 are preferably made from Velcro-type connecting hook and loop members, but can be of any conventional releasable connector mechanisms known today. For example, a combination of a permanent magnet and a mating ferrous material could be utilized. With the quick change adapter mechanism 60, the eyeglasses 124' can be connected to the module 100 or tubular member 14 in a relatively quick and easy manner, simply by attaching and detaching the fasteners.

The adapter member 62 can be glued or otherwise affixed to the tubular member 14. In this regard, a "peel-off" type of adhesive could be used to secure the member 62 to the member 14. Alternately, the module 100 and tubular member 14 could be manufactured with adapter member 62 molded or otherwise integrated into its structure.

The tubular adapter 70 is provided to facilitate use of the adapter member 60 with various sizes and shapes of eyeglass frames. In this regard, with standard eyeglasses, the temple 122' is cut off at an appropriate point and the tubing 70 slipped over the end, designed for a snug fit. If necessary, an adhesive may be supplied inside the tubing 70 to insure a permanent fitting.

As is understood, if two behind-the-ear modules are utilized, both temples of the pair of eyeglasses would need to be modified.

When putting on a pair of glasses, the wearer simply must make sure the two members of the adapter mechanism 60 mate and are snugly engaged. Removal of the glasses is straightforward. In this regard, the connector materials forming the connector members 66 and 68 should be selected to provide the best compromise between a solid, reliable connection and one which is easily disengaged without dislodging the behind-the-ear module 100.

Although particular embodiments of the present invention have been illustrated in the accompanying drawings and described in the foregoing detailed description, it is to be understood that the present invention is not to be limited to just the embodiments disclosed, but that they are capable of numerous rearrangements, modifications and substitutions without departing from the scope of the claims hereafter.

It is claimed:

1. A portable, wearable communication and entertainment audio system comprising:

an audio mechanism, said audio mechanism comprising a body member adapted to be positioned behind the ear of the user, a tubular member for transmitting audio from said audio mechanism to the ear of a wearer, and an ear insert member positioning said tubular member in the ear;

said ear insert member being made from an acoustically transparent material which allows substantially full acoustic transmission therethrough;

said audio mechanism having a first output transducer in said body member for providing transmission of acoustic sounds in the frequency range of normal human hearing; and an adapter mechanism for connecting said audio mechanism to the end of a shortened earpiece of a pair of eyeglasses, said shortened earpiece terminating in front of the wearer's ear and said adapter mechanism comprising a first connector member adapted to be attached to said audio mechanism, a second connector member having a socket for attaching to the end of said shortened earpiece, and a selectively releasable attachment mechanism positioned between said first and second connector members.

2. The system as set forth in claim 1 wherein said selectively releasable attachment mechanism comprises a hook-and-loop type mechanism.

3. The system as set forth in claim 2 wherein said hook-and-loop type mechanism comprises a Velcro attachment mechanism.

4. The system as set forth in claim 1 wherein said second connector member is a tubular member.

5. The system as set forth in claim 1 wherein said selectively releasable attachment mechanism comprises first and second magnetic members.

6. The system as set forth in claim 1 wherein said acoustically transparent material is an open-cell foam.

7. The system as set forth in claim 1 further comprising a layer of perforated flexible material covering at least a portion of said ear insert member for improved wearing comfort.

8. The system as set forth in claim 1 further comprising a second output transducer.

9. The system as set forth in claim 8 wherein said second output transducer is positioned on said ear insert member and comprises a perforated piezoelectric material.

10. The system as set forth in claim 8 wherein said second output transducer is positioned on said tubular member.

* * * * *